United States Patent
Schiewe

(10) Patent No.: US 9,377,866 B1
(45) Date of Patent: Jun. 28, 2016

(54) DEPTH-BASED POSITION MAPPING

(71) Applicant: Amazon Technologies, Inc., Reno, NV (US)

(72) Inventor: Robert Schiewe, Lake Forest, CA (US)

(73) Assignee: Amazon Technologies, Inc., Reno (*) Notice: Subject to any disclaimer, the term of this patent is extended or adjusted under 35 U.S.C. 154(b) by 196 days.

(21) Appl. No.: 13/966,942

(22) Filed: Aug. 14, 2013

(51) Int. Cl.
*G09G 5/00* (2006.01)
*G06F 3/01* (2006.01)
*G06F 3/042* (2006.01)
*G06F 3/00* (2006.01)
*G06F 3/03* (2006.01)

(52) U.S. Cl.
CPC .............. *G06F 3/017* (2013.01); *G06F 3/005* (2013.01); *G06F 3/0325* (2013.01); *G06F 3/0425* (2013.01); *G06F 2203/04101* (2013.01)

(58) Field of Classification Search
CPC ........ G06T 7/004–7/0048; G06T 2207/10021; G06T 2207/10024; G06T 2207/20144; G06T 7/0081; G06T 7/20; G06F 3/016–3/038; G06F 3/0421; G06F 3/017; G06F 3/0304; G06F 3/0425; G06F 3/0426; G06F 3/005; G06F 2203/04101; G06F 3/0346; G06F 3/04815; G06F 3/011; G06F 3/03; G06F 3/0325; G06F 3/042; G06F 3/048; G09G 5/08; G06K 9/00375; G06K 9/4604; B60K 2350/1052; B60K 2350/2013; G02B 2027/0138

USPC ........... 345/156–159, 162, 175; 382/103, 291
See application file for complete search history.

(56) References Cited

U.S. PATENT DOCUMENTS

| | | | |
|---|---|---|---|
| 2006/0010400 A1* | 1/2006 | Dehlin et al. ................. | 715/856 |
| 2009/0231269 A1* | 9/2009 | Ueshima et al. .............. | 345/156 |
| 2010/0329511 A1* | 12/2010 | Yoon et al. .................... | 382/103 |
| 2011/0080490 A1* | 4/2011 | Clarkson et al. ........... | 348/222.1 |
| 2011/0148822 A1* | 6/2011 | Jung et al. .................... | 345/175 |
| 2012/0105573 A1* | 5/2012 | Apostolopoulos ......... | 348/14.08 |
| 2012/0162077 A1* | 6/2012 | Sze et al. ...................... | 345/163 |

\* cited by examiner

*Primary Examiner* — Amare Mengistu
*Assistant Examiner* — Gloryvid Figueroa-Gibson
(74) *Attorney, Agent, or Firm* — Hogan Lovells US LLP

(57) ABSTRACT

Approaches to analyze image data to detect a blob corresponding to a user's hand (or other feature) and analyze the depth information associated with the blob to determine a location on a display screen. For example, the user may be pointing one or more fingers towards a particular location on the screen and the computing device may analyze the depth information associated with the user's finger and hand to compute the corresponding location on the screen that finger should be mapped to. Additionally, the computing device may track the movement of the user's finger with respect to other portions of the user's hand (e.g., center of the hand) and adjust the mapped location on the screen based on the tracked movement.

20 Claims, 7 Drawing Sheets

DEPTH-BASED POSITION MAPPING

BACKGROUND

Given the pervasiveness of computing devices today, consumers are utilizing devices, such as tablets and mobile phones, for a wide variety of different purposes. A user can make telephone calls, play games, access the internet, send electronic mail or other communications and perform many other functions. Many devices utilize a touch screen to receive input from users of the device. More recently, such devices have begun utilizing gesture input as well, such as where a user makes motions using their hand in front of the device to provide input to the device. The device is usually able to detect and recognize such gestures by using one or more "front-facing" cameras or other sensors embedded in the device. Such gesture input may also be provided to computing devices equipped with large display screens, such as projection screens, large liquid crystal display (LCD) monitors and the like.

Some devices are able to invoke functions by determining a position of a user's hand or finger held in front of the screen. For example, when playing certain games, a user is sometimes allowed to control a cursor on the screen by moving their hand across the screen from one side the other. One difficulty that users may experience when providing such gesture input is that it may get tiresome for a user to move their hand and/or arm from one side of the screen to the other when playing certain games or trying to access various functionality of the device. This can be especially uncomfortable where the detection area for tracking the user's hand is large. Another issue may arise when two or more users try to access the same object displayed on the screen by moving their hands to the same location corresponding to the object, thereby potentially physically bumping into the one another. This can be uncomfortable and inconvenient for users.

BRIEF DESCRIPTION OF THE DRAWINGS

Various embodiments in accordance with the present disclosure will be described with reference to the drawings, in which.

DETAILED DESCRIPTION

Figure 1:
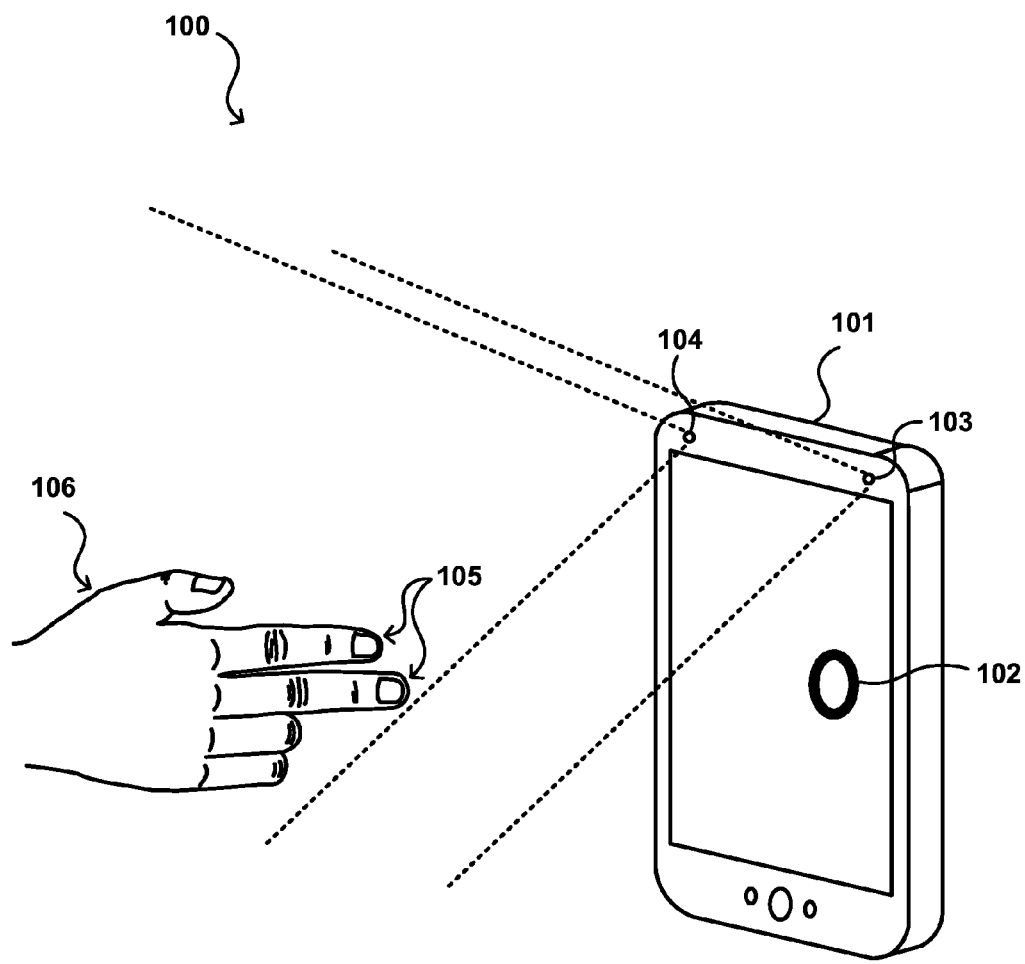
FIG. 1 illustrates an example of a computing device being used in the context of depth based position mapping, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for providing input to computing devices. In various embodiments, a computing device, such as a phone or tablet computer, can analyze image data to detect a blob within the image corresponding to a user's hand (or other object) and analyze the depth information associated with the blob to determine which location on the screen corresponds to the user's intent. For example, the user may be pointing one or more fingers towards a particular location on the display screen and the computing device may analyze the depth information associated with the user's finger and hand to compute the corresponding location on the screen that finger should be mapped to. Additionally, the computing device may track the movement of the user's finger with respect to other portions of the user's hand (e.g., center of the hand) and adjust the mapped location on the screen based on the tracked movement. This can allow the user's hand to stay stationary while the user is pointing in different directions relative to the hand's position and reach all the extremes of the display screen despite the smaller movement area. For an example of one possible use case, a person could use two fingers extended on one hand to make a 'gun' in a shooting gallery game or simulation, and then point the tips of the fingers around while leaving the fist/hand stationary to aim at all screen locations.

In accordance with an embodiment, a computing device processes images captured by one or more cameras to identify at least one blob corresponding to a user's hand. A blob is a region of an image in which some properties are constant or vary within a prescribed range of values and therefore all the points in a blob can be grouped together and considered in some sense to be similar to each other (and/or different from the surrounding areas around the blob). The blob may be identified based on depth and other information using a set of defined thresholds. Depth information may be obtained based on the stereo disparity of the blob between images captured using a pair of stereoscopically configured cameras or by some other methods. In one embodiment, if the depth information indicates that the object associated with the blob is within a minimum threshold distance to the device and if the blob is of a minimum threshold size, the blob may be identified as corresponding to the user's hand. In some cases, there may be several blobs in the image that satisfy the requirements to be considered a blob corresponding to the user's hand and each of the multiple blobs can be independently tracked for user input.

Once the computing device has identified the blob, the computing device may determine a closest portion of the blob (e.g., the portion of the blob having the highest average depth). This portion would typically correspond to the portion of the hand that is the closest in distance to the cameras of the device, i.e., the fingertip (or multiple fingertips) of the user's finger extending towards the device. Furthermore, the device may determine (or estimate) a centroid of the blob, as well as the outer boundaries of the blob. The computing device can then track the movement of the closest portion (e.g., highest depth portion) of the blob (e.g., the fingertip) with reference to the centroid of the blob. The tracking of the movement can be performed by plotting a coordinate system (e.g., x and y axis) based on the centroid of the blob and outer boundary of the blob and tracking the coordinate changes of the high depth portion of the blob over time. Thus, if the user moves the finger(s) pointing towards the device while maintaining the hand stationary, this would register as movement (i.e., changes in coordinates) of the closest portion with respect to the centroid of the blob. Based on the tracked movement, the device can map the position of the closest portion of the blob (i.e., fingertip) to a corresponding location on the screen. Based on this corresponding location, input can be provided to the device. For example, the computing device may display a cursor object in the corresponding location on the screen, such that the user is able to move the cursor object by aiming their finger at various portions of the screen and keeping their hand stationary. In at least some embodiments, if multiple blobs are being tracked, multiple hands are able to point at the same location on the screen without having to be in the same physical position in front of the device. This can avoid users physically bumping into each other when playing games or otherwise providing input to the device.

The terms "closest portion" and "highest depth portion" are used interchangeably throughout this disclosure and they refer to the portion of the blob that corresponds to the part of the object that is closest in distance to the camera/device. The closest portion is identified by analyzing the depth information of the object, such as the stereo disparity information associated with various portions of the blob or by other techniques, as described throughout this disclosure.

It should also be noted that although most examples described throughout this disclosure refer to a user's hand and/or fingers, this should not be construed as a limitation to all of the possible embodiments. For example, in various alternative embodiments, the user may utilize a stylus or other pointing object to point at the screen and the computing device may analyze the blob corresponding to such a stylus or object. It will be evident to one of ordinary skill in the art, that many different objects can easily be utilized to provide input to the computing device.

FIG. 1 illustrates an example 100 of a computing device being used in the context of depth based position mapping, in accordance with various embodiments. In this illustration, the computing device 101 is shown to be a mobile phone, however the computing device 101 may be any device having a processor, memory and a display, including but not limited to tablet computers, electronic readers (e-readers), digital music players, laptops, personal digital assistants (PDAs), personal computers (PCs), wearable computers, such as visors or virtual glasses, or the like. The computing device 101 may include one or more digital cameras configured to capture an image or a sequence of images. In at least some embodiments, the computing device 101 is equipped with a pair of front-facing cameras 103, 104 that are capable of capturing images of various features of the user as the user is using the device 101. For example, the images captured by the cameras 103, 104 may contain a representation of the user's hand 106, fingertips 105 or any other feature within the field of view (FOV) of the cameras 103, 104.

In various embodiments, the computing device may analyze the image data being captured by the front-facing cameras 103, 104 (including any depth information determined from the stereo disparity between the images captured by cameras 103 and 104) and track the movement of the user's fingertips 105 (or a single fingertip) to determine a corresponding location 102 on the display screen of the computing device 101. This location can be used to provide user input to the computing device 101. For example, in a shooting game, the user may point at the various graphical elements being displayed on the display screen in order to target those elements as part of the game play. As another example, a cursor object may be displayed on the display screen and the user may point the fingertips 105 in any appropriate direction in order to move the cursor object, select various functions using the cursor and the like. Many other examples of user input are possible as will be evident to one of ordinary skill in the art based on the teachings of this disclosure.

It should be noted that although FIG. 1 illustrates an example where two fingertips 105 of the user are being used to provide input, in alternative embodiments a different number of fingertips (e.g., a single fingertip, three fingertips, etc.) may easily be utilized. Furthermore, it will also be evident to one of ordinary skill in the art that the various embodiments described herein are not limited to a hand and fingertip but can include other features of the user, such as an entire arm, head/face and the like.

Figure 2A:
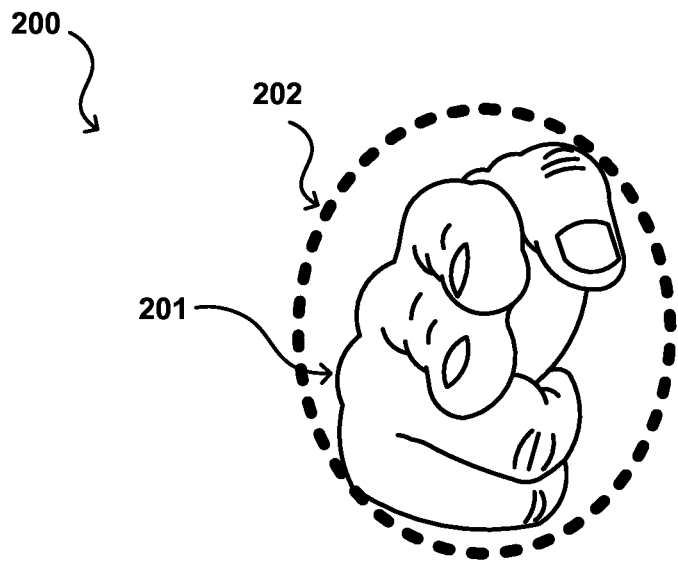
FIG. 2A illustrates an example of a front camera view of the user's hand with the fingertips extended towards the cameras of the computing device, in accordance with various embodiments.
Figure 2B:
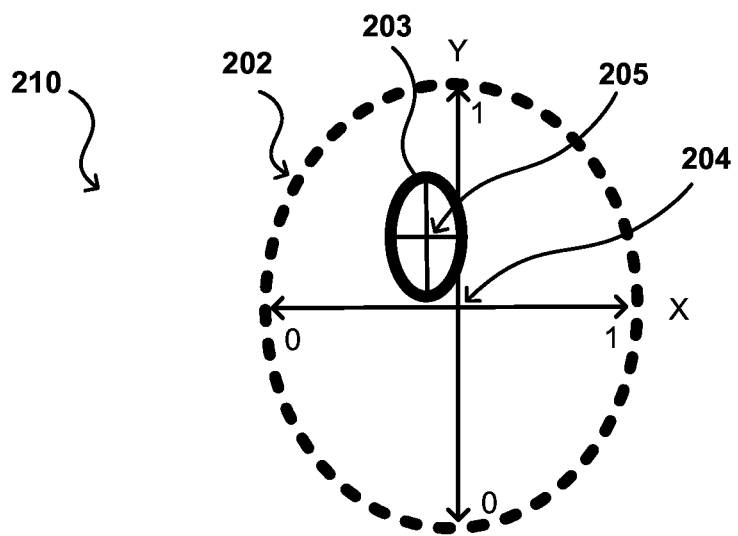
FIG. 2B illustrates an example of determining the centroid of the blob and the highest depth portion of the blob, in accordance with various embodiments.

FIGS. 2A and 2B illustrate examples of tracking a blob corresponding to a user's hand for mapping depth based positions, in accordance with various embodiments. In particular, FIG. 2A illustrates an example 200 of a front camera view of the user's hand 201 with the fingertips extended towards the cameras of the computing device, such as may be contained within an image captured by the cameras. In various embodiments, the computing device may analyze such an image to identify a blob 202 corresponding to the user's hand 201, including the two fingertips extended towards the screen, as well as the remaining portions of the hand. Blob detection is well known in the art and refers to any technique that can be used to detect regions in a digital image that differ in one or more properties, such as brightness or color, compared to areas surrounding those regions. A blob is a region of an image in which some properties are constant or vary within a prescribed range of values and therefore all the points in a blob can be grouped together and considered in some sense to be similar to each other.

In various embodiments, the blob 202 corresponding to the user's hand 201 can be determined based on a number of predefined thresholds. For example, if the depth information associated with the blob 202 indicates that the object is within a minimum threshold distance to the device and if the blob 202 is of a minimum threshold size, the blob can be considered as corresponding to the user's hand and the computing device may initiate the tracking of the blob 202 for input. In various embodiments, the depth information of the blob can be determined based on stereo disparity information. The use of stereo disparity information to determine depth/distance will be described in further detail with reference to FIGS. 3-5 later in this disclosure. However, it is noted that the various embodiments are not limited to the use of stereo disparity for distance determination and that other methods for determining the depth and/or distance to an object may be utilized within the scope of the various embodiments described herein. For example, in some embodiments, a light emitting diode (LED) may be embedded in the computing device and may be used to emit light onto the objects within the field of view of the cameras, such as onto the user's hand. The computing device may then analyze the reflections of the light on the various objects in the image to determine (or at least estimate) the depth information of each object. For example, objects closer to the LED (and thus closer to the cameras) will reflect more light emitted by the LED than objects further away from the LED. Based on the intensity and/or amount of the reflection, the computing device may determine the depth information of each object and thus determine which objects or which portions of the objects are closer to the display screen of the device and which are further away. In yet other embodiments, distance sensors embedded in the computing device or other devices may be utilized to compute depth information of the objects in the image.

Once the blob 202 corresponding to the user's hand 201 has been identified by the computing device, the computing device may determine a centroid 204 of the blob and the outer boundaries of the blob. The centroid 204 can be determined based on the boundaries of the blob. In various embodiments, the centroid 204 of the blob is the arithmetic mean ("average") position of all the points in the blob. Techniques for determining a centroid of a two dimensional region are well known in the art.

In addition to determining the centroid 204 of the blob and the outer boundaries of the blob, the computing device may also determine (e.g., select) a highest depth portion 203 of the blob. FIG. 2B illustrates an example 210 of determining the centroid of the blob 202 and the highest depth portion 203 of the blob 202, in accordance with various embodiments. In various embodiments, the highest depth portion 203 may be the portion of the object 201 that is determined to be closest in distance to the camera of the device. For example, if stereo disparity is used to determine depth information, the highest depth portion 203 may be the portion of the blob having the highest stereo disparity (i.e., having a higher stereo disparity than the remaining portions of the blob). As another example, if LED lighting is used to determine the depth information, the highest depth portion 203 of the blob may be the portion of the object that reflects the largest amount of light back to the camera. In some embodiments, a weighted average can be used, such that one point of noise would not immediately be considered the peak but a sufficient sized portion of the blob that has the highest average point will be selected. Once the highest depth portion of the blob is selected, a center point 205 of that portion 203 (or some other point of the portion) may be selected to determine the coordinates of the highest depth portion 203 of the blob.

Once the two points (i.e., the centroid 204 of the entire blob and the center 205 of the highest depth portion 203 of the blob) have been selected, the computing device can track the movement of the highest depth portion 203 with respect to the centroid 204 of the entire blob. In one embodiment, a coordinate system can be plotted based on the center points and based on the edges (i.e., outer boundaries) of the blob, where the computing device can calculate a position of the highest depth portion from 0 to 1 along each axis (e.g., X axis and Y axis). This 0 to 1 in each axis can be mapped onto the display screen (or it could be mapped onto another area of reference). The centroid (center point) can be 0.5 along each axis. There can also be X and Y bounds of the blob which are the furthest points in each direction.

In various embodiments, the computing device can track the movement of the highest depth portion 203 by determining the changes in coordinates of the center 205 of the highest depth portion with respect to the centroid of the entire blob 204. The computing device can also map the position of the highest depth portion 203 to a location on the display screen. In this manner, the user may control the location on the display screen by simply pointing their finger at various portions of the display screen and without the need to move their entire hand to reach the desired locations. In some embodiments, moving the entire hand may still cause a change in the corresponding location on the display screen (e.g., position of the cursor on the screen), however the location changes due to the movement of the entire hand would be smaller in scale than the location changes caused by the movement of the highest depth portion 203 with respect to the centroid 204. Since the coordinate system of the blob covers the entire display screen, relatively small movements of the user's fingertip can cover much larger distances on the display screen. In contrast moving the entire hand across the screen may cause smaller effects on the changes in the location on the screen.

In some embodiments, multiple blobs may be tracked simultaneously by the computing device. For example, a user may use both hands to provide input to the computing device. Similarly, multiple users may use their hands to provide input to the computing device. In various embodiments, each hand can be independently tracked by the computing device using the techniques described above. Because the users are able to use their fingertips to reach any location on the screen by pointing, multiple hands/fingers may reach the same location on the screen without being in the same physical location in front of the screen (i.e., without physically bumping into each other).

Figure 3:
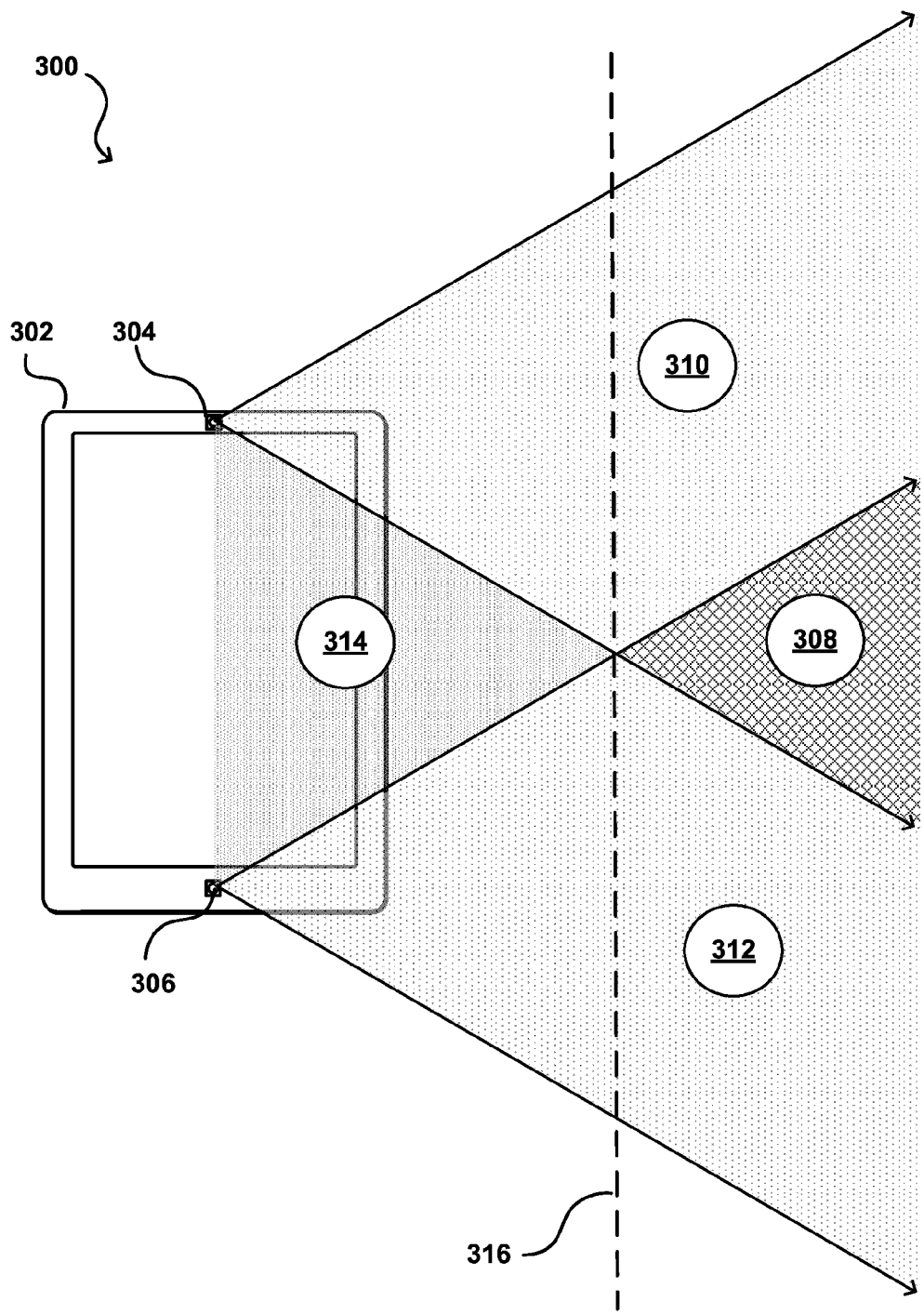
FIG. 3 illustrates an example situation where a pair of front-facing cameras of a computing device is capturing image information over respective fields of views, in accordance with various embodiments.
Figure 4A:
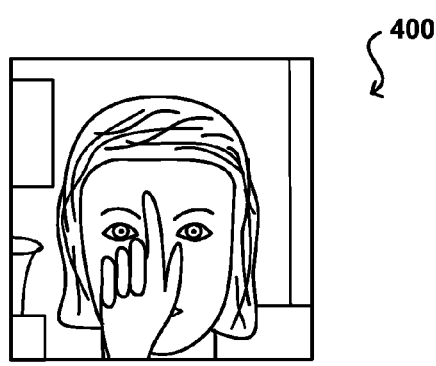
FIG. 4(a) illustrates an example of an image that could be captured using one of the front-facing stereo cameras embedded in a computing device.
Figure 4B:
FIG. 4(b) illustrates an example of another image that could be captured using one of the front-facing stereo cameras embedded in a computing device.
Figure 4C:
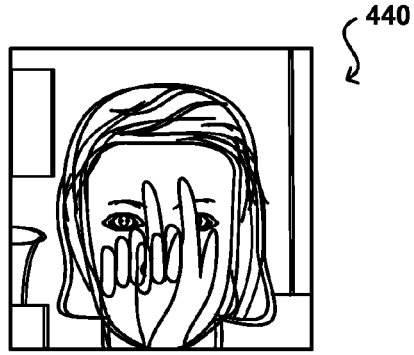
FIG. 4(c) illustrates an example combination image showing relative position of various objects in the captured images.
Figure 5:
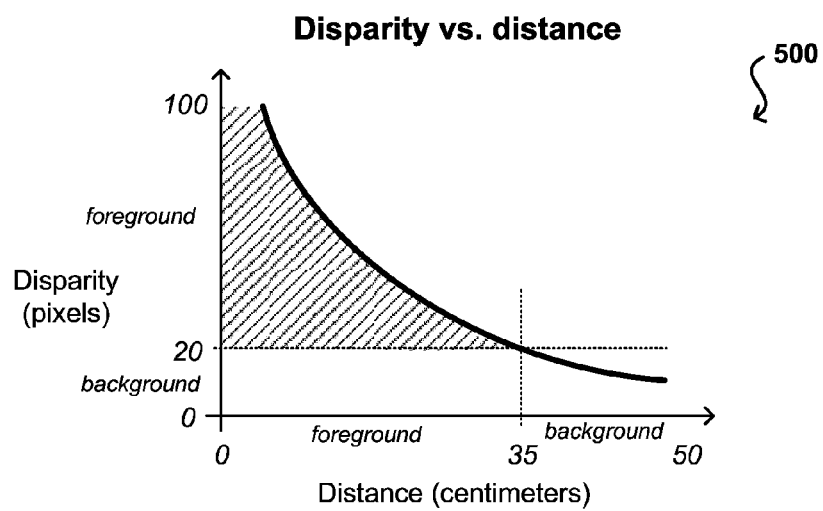
FIG. 5 illustrates an example plot showing a relationship of disparity with distance, in accordance with various embodiments.

As previously described, stereo disparity information may be utilized to determine the depth information of the various portions of the blob if the computing device is equipped with at least two cameras that have been configured for stereo image processing. FIGS. 3-5 illustrate some general examples of front-facing cameras configured for stereo imaging and analyzing the image data captured by such cameras to computes stereo disparities.

For example, FIG. 3 illustrates a situation 300 where a pair of front-facing cameras 304, 306 of a computing device 302 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 308 or region that is a distance from the device 302. Any object (e.g., user's face or other feature) that is located within the overlap zone 308 would be seen by both cameras 304, 306 and therefore can have disparity information determined for the object. Using conventional stereo imaging approaches, anything closer to the device than this overlap zone 308 may not be able to have disparity information determined, as the object would be seen by at most one of the cameras. In other words, an object in a zone 314 close to the device and between the cameras 304, 306 may not be seen by either camera and thus may not be included in the disparity information. However, in various embodiments, because the user's face is large enough and is usually located at a sufficient distance away from the computing device, it would be infrequent for none of the user's features to be present within the overlap zone 308. Even in such cases, the disparity information for zone 314 may be estimated based on previous measurements and/or motion tracking, for example. There may also be two zones 310, 312 where an object can only be seen by one of the cameras 304, 306. Again, while disparity information cannot be calculated for items that are located solely in either of these zones, it would be highly unusual for none of the user's features to be present in the overlap zone 308. As discussed, the effect of these zones 310, 312 decreases with distance, such that past a certain distance the fields of view of the cameras substantially overlap.

Systems and methods in accordance with various embodiments can take advantage of the relationship between disparity and distance to determine the distance and depth information. For example, FIGS. 4(a) and 4(b) illustrate images 400, 420 that could be captured using a pair of front-facing stereo cameras embedded in a computing device. In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the feature detection algorithms mentioned above. FIG. 4(c) illustrates an example combination image 440 showing the relative position of various objects in the captured images 400, 420. As illustrated, objects closest to the camera, such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

FIG. 5 illustrates an example plot 500 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can determine the distance between a user's feature and the camera based on the amount of stereo disparity between the two images captured by the pair of front-facing cameras. For example, a user's face looking at a smart phone might typically be located within 50 centimeters from the device. By examining the disparity relationship curve 500 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, etc.) in the stereo images, and estimate the distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. Based on relationships such as this one, the computing device may be able to determine the distance between the user's feature points and the camera.

Figure 6:
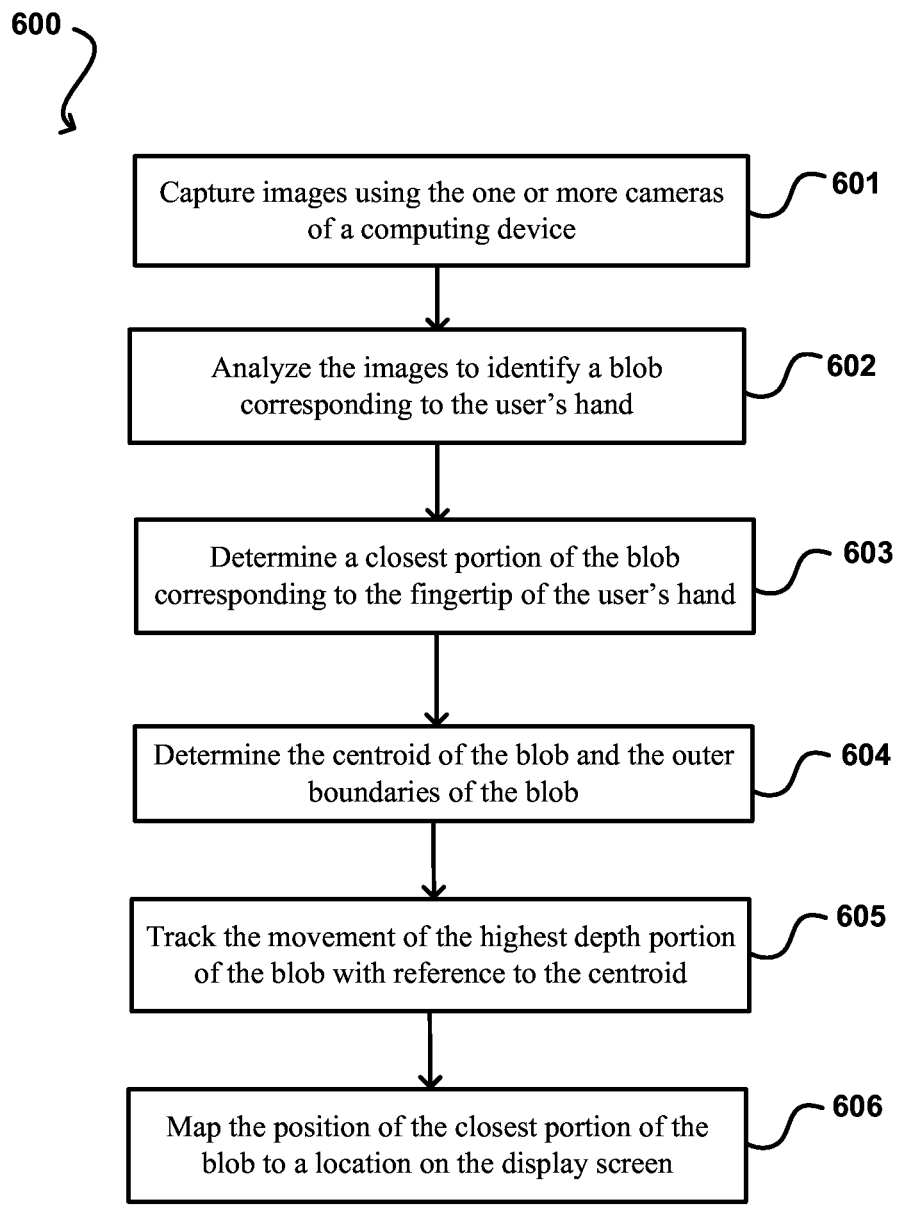
FIG. 6 illustrates an example of a process for depth based position mapping, in accordance with various embodiments.

FIG. 6 illustrates an example of a process 600 for depth based position mapping, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 601, the computing device captures images using one or more cameras embedded in the computing device. For example, the cameras may be a pair of stereoscopically configured front-facing cameras embedded in a mobile phone or a tablet computer. The cameras may be configured to take stereoscopic images, such that stereo disparity information can be determined from examining the corresponding objects in each image, as described above.

In operation 602, the computing device analyzes the image data to identify a blob corresponding to a user's hand. For example, the computing device may identify the blob if the blob is of a minimum threshold size and is of a minimum threshold distance to the display screen. As previously described, the depth/distance information may be determined based on the stereo disparity or by other techniques known in the art.

Once the device identifies the blob, the device may determine the highest depth portion (e.g., the weighted average high depth portion) of the blob, as shown in operation 603. The highest depth portion would correspond to the portion of the object that is closest to the device (i.e., cameras of the device). For example, the highest depth portion may correspond to the fingertip of the user's fingers pointing at the device. In operation 604, the computing device also determines the centroid of the blob, such as be determining the arithmetic mean (e.g., "average) position of all the points in the blob. The device may also determine the outer boundaries of the blob in the image. In one embodiment, a coordinate system (e.g., X, Y axes) can be established based on the centroid and the outer boundaries. This coordinate system can be used to track the movement of the highest depth portion of the blob with respect to the centroid, as shown in operation 605. For example, the computing device may track the changes in coordinates of the highest depth portion over time. In operation 606, the computing device maps the position of the highest depth portion to a location on the display screen. As the highest depth portion moves, the computing device may continuously translate the movement in the corresponding change in location on the display screen. Based on the location on the display screen, input can be provided to the device. For example, in some embodiments, a cursor object may be displayed on the screen, where a user is able to move the cursor object by moving their finger. Similarly, other input can be provided to the device, such as targeting in a shooting game/simulation or the like.

Figure 7:
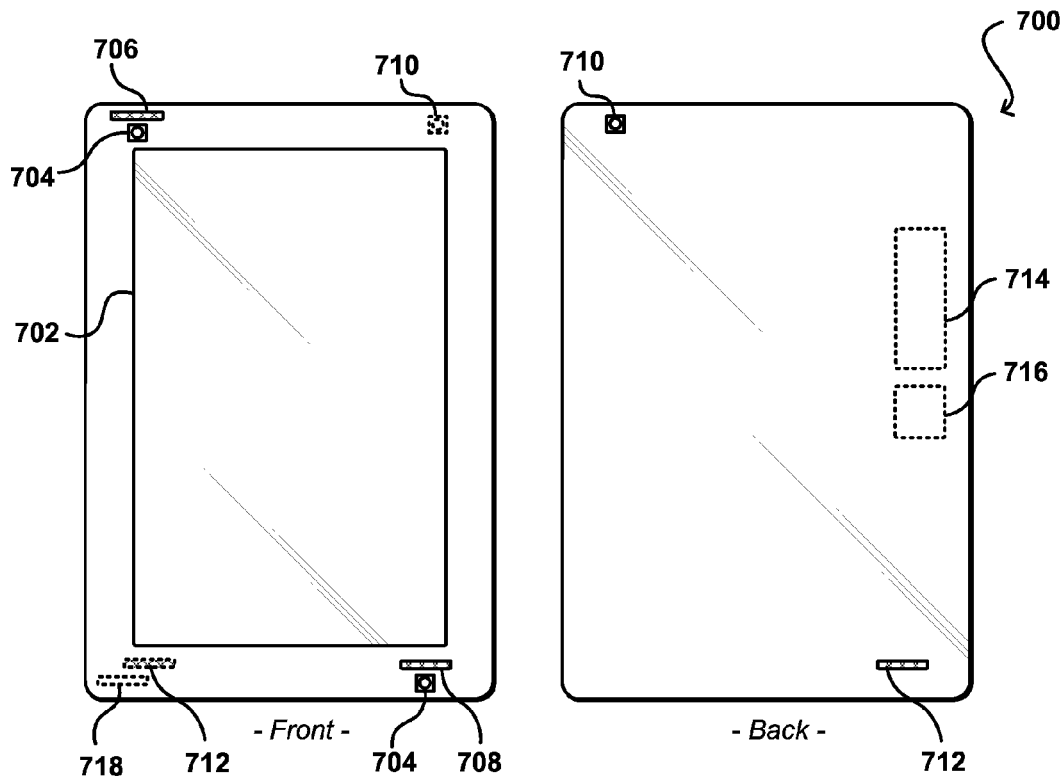
FIG. 7 illustrates front and back views of an example portable computing device that can be used in accordance with various embodiments.

FIG. 7 illustrates front and back views of an example client computing device 700 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 700 has a display screen 702 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 710 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 704 on the "front" of the device and one image capture element 710 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 706 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 700 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 714, such as may include at least one wired or wireless component operable to communicate with one or more portable computing devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
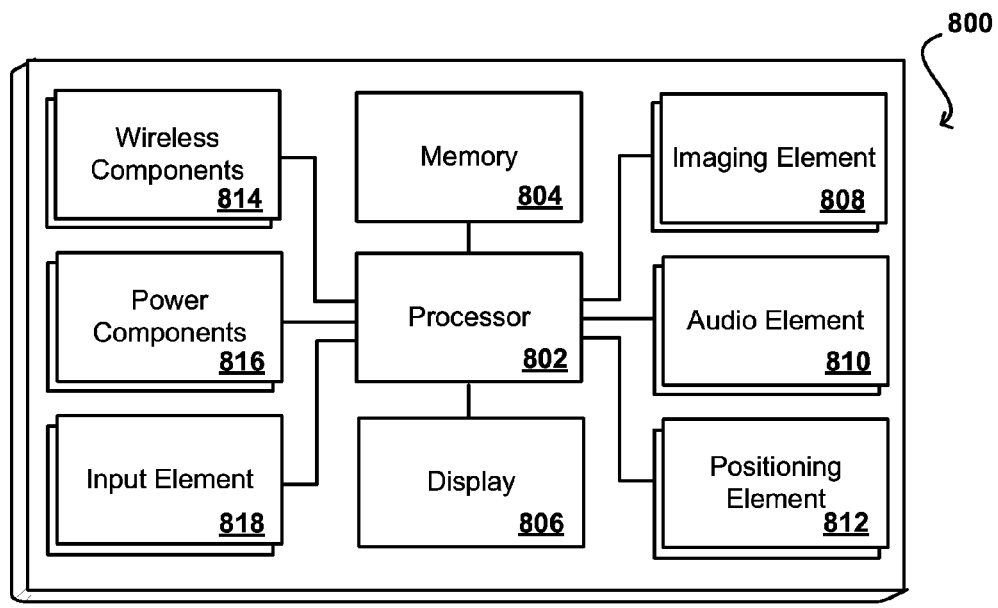
FIG. 8 illustrates an example set of basic components of a portable computing device, such as the device described with respect to FIG. 7.

In order to provide functionality such as that described with respect to FIG. 7, FIG. 8 illustrates an example set of basic components of a portable computing device 800, such as the device 700 described with respect to FIG. 7. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 812 that provides information such as a position, direction, motion, or orientation of the device. This positioning element 812 can include, for example, accelerometers, inertial sensors, electronic gyroscopes, electronic compasses, and GPS elements.

The device can include at least one additional input device 818 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 814 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 9:
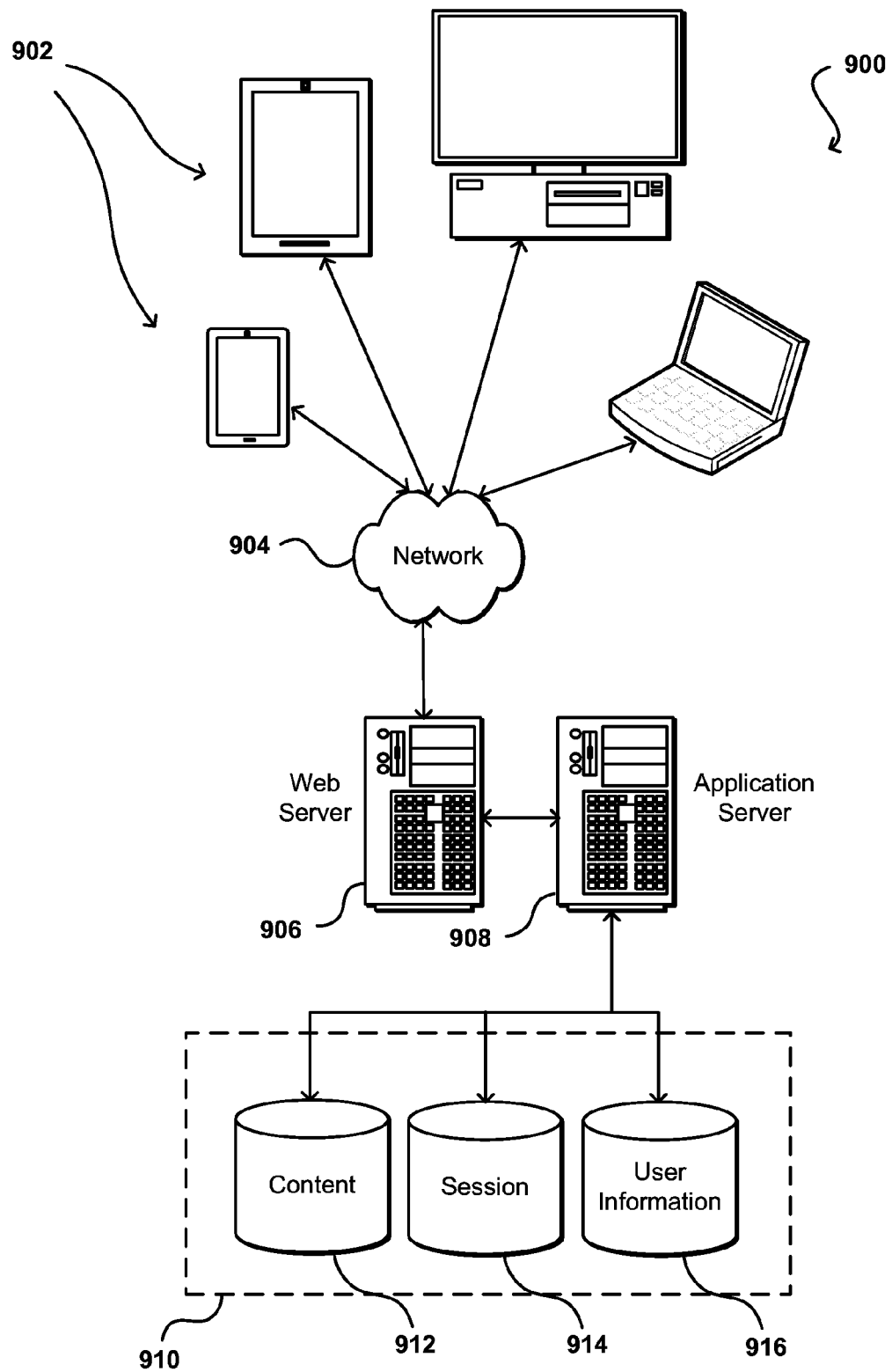
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 802 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
one or more cameras;
a display screen;
at least one processor; and
memory including instructions that, when executed by the at least one processor, cause the computing device to:
  capture one or more images using the one or more cameras;
  analyze the one or more images to identify a blob corresponding to the user's hand;
  determine a closest portion of the blob corresponding to a portion of the user's hand that is closest in distance to the one or more cameras based at least in part on depth information obtained from the one or more images, the closest portion of the blob corresponding to at least one fingertip of the user's hand;
  determine a centroid and edges of the blob;
  map the position of the closest portion of the blob to a corresponding location on the display screen;
  track a movement of the closest portion of the blob, the tracked movement of the closest portion of the blob being compared to the centroid and edges of the blob; and
  adjust the mapping of the corresponding location on the display screen based on the tracked movement of the closest portion of the blob with reference to the centroid of the blob.

2. The computing device of claim 1, wherein the memory further comprises instructions that, when executed by the at least one processor, cause the computing device to:

display a cursor object in the corresponding location on the display screen; and control a position of the cursor object on the display screen based on the tracked movement of the closest portion of the blob.

3. The computing device of claim 1, wherein the depth information is determined based on a stereo disparity between a first image captured by a first camera and a second image captured by a second camera.

4. The computing device of claim 1, wherein determining the closest portion of the blob further comprises:

selecting a portion of the blob having an average depth that is higher than a defined threshold.

5. The computing device of claim 1, wherein the memory further comprises instructions that, when executed by the at least one processor, cause the computing device to: plotting a coordinate system based at least in part on the centroid of the blob and outer boundary of the blob, the coordinate system including a first axis and a second axis; and using the coordinate system to track movement of a highest depth portion of the blob with respect to the centroid.

6. A computer implemented method, comprising:

under the control of one or more computer systems configured with executable instructions, processing image data captured using one or more cameras;

identifying a blob in the image data;

determining a first portion of the blob based at least in part on depth information obtained from the image data;

determining a second portion of the blob based at least in part on a centroid and edges of the blob;

tracking a movement of the first portion of the blob, the movement of the first portion of the blob being compared to the second portion of the blob; and mapping a position of the first portion of the blob to a location on a display screen based on the movement.

7. The computer implemented method of claim 6, wherein the blob corresponds to a user's hand and wherein the first portion of the blob corresponds to at least one fingertip of the user's hand.

8. The computer implemented method of claim 7, further comprising:

identifying a second blob in the image data, the second blob corresponding to a second hand;

determining a first portion of the second blob based at least in part on depth information obtained from the image data, the first portion of the second blob corresponding to at least one fingertip of the second hand;

determining a second portion of the second blob based at least in part on a centroid of the blob;

tracking a movement of the first portion of the second blob with reference to the second portion of the second blob; and mapping the position of the first portion of the second blob to a second location on the display screen;

wherein the first portion of the blob and the first portion of the second blob can be mapped to the same location on the display screen.

9. The computer implemented method of claim 6, wherein identifying the blob further comprises:

identifying a portion of an image having a defined size threshold and a defined depth threshold.

10. The computer implemented method of claim 6, further comprising:

displaying a cursor object in the corresponding location on the display screen; and controlling a position of the cursor object on the display screen based on the tracked movement of the first portion of the blob.

11. The computer implemented method of claim 6, wherein the depth information is determined based on a stereo disparity between a first image captured by a first camera and a second image captured by a second camera.

12. The computer implemented method of claim 6, wherein determining the first portion of the blob further comprises:

selecting a portion of the blob having an average depth that is higher than a defined threshold.

13. A non-transitory computer readable storage medium storing one or more sequences of instructions that, when executed by one or more processors, cause a computing system to:

process image data captured using one or more cameras;

identify a blob in the image data;

determine a first portion of the blob based at least in part on depth information obtained from the image data;

determine a second portion of the blob based at least in part on a centroid and edges of the blob;

track a movement of the first portion of the blob, the movement of the first portion of the blob being compared to the second portion of the blob; and map a position of the first portion of the blob to a location on a display screen based on the movement.

14. The non-transitory computer readable storage medium of claim 13, wherein the blob corresponds to a user's hand and wherein the first portion of the blob corresponds to at least one fingertip of the user's hand.

15. The non-transitory computer readable storage medium of claim 14, further comprising instructions that when executed by the one or more processors, cause the computing system to:

identify a second blob in the image data, the second blob corresponding to a second hand;

determine a first portion of the second blob based at least in part on depth information obtained from the image data, the first portion of the second blob corresponding to at least one fingertip of the second hand;

determine a second portion of the second blob based at least in part on a centroid of the blob;

track a movement of the first portion of the second blob with reference to the second portion of the second blob; and map the position of the first portion of the second blob to a second location on the display screen;

wherein the first portion of the blob and the first portion of the second blob can be mapped to the same location on the display screen.

16. The non-transitory computer readable storage medium of claim 13, wherein identifying the blob further comprises:

identifying a portion of an image having a defined size threshold and a defined depth threshold.

17. The non-transitory computer readable storage medium of claim 13, further comprising instructions that when executed by the one or more processors, cause the computing system to:

display a cursor object in the corresponding location on the display screen; and control a position of the cursor object on the display screen based on the tracked movement of the first portion of the blob.

18. The non-transitory computer readable storage medium of claim 13, wherein the depth information is determined based on a stereo disparity between a first image captured by a first camera and a second image captured by a second camera.

19. The non-transitory computer readable storage medium of claim 13, wherein determining the first portion of the blob further comprises:
   selecting a portion of the blob having an average depth that is higher than a defined threshold.

20. The non-transitory computer readable storage medium of claim 13, further comprising instructions that, when executed by the one or more processors, cause the computing system to:
   plot a coordinate system based at least in part on the centroid of the blob and outer boundary of the blob, the coordinate system including a first axis and a second axis; and
   use the coordinate system to track movement of a highest depth portion of the blob with respect to the centroid.

* * * * *